United States Patent
Ihli

(10) Patent No.: US 9,611,750 B2
(45) Date of Patent: Apr. 4, 2017

(54) TURBINE FOR AN EXHAUST GAS TURBOCHARGER

(71) Applicant: IHI CHARGING SYSTEMS INTERNATIONAL GMBH, Heidelberg (DE)

(72) Inventor: Thomas Ihli, Ilvesheim (DE)

(73) Assignee: IHI CHARGING SYSTEMS INTERNATIONAL GMBH, Heidelberg (DE)

( * ) Notice: Subject to any disclaimer, the term of this patent is extended or adjusted under 35 U.S.C. 154(b) by 388 days.

(21) Appl. No.: 14/292,931

(22) Filed: Jun. 1, 2014

(65) Prior Publication Data
US 2014/0286759 A1    Sep. 25, 2014

Related U.S. Application Data

(63) Continuation-in-part of application No. PCT/EP2012/004994, filed on Dec. 4, 2012.

(30) Foreign Application Priority Data

Dec. 16, 2011 (DE) .................. 10 2011 121 330

(51) Int. Cl.
*F01D 17/00* (2006.01)
*F01D 17/14* (2006.01)
*F02C 6/12* (2006.01)

(52) U.S. Cl.
CPC ........... *F01D 17/00* (2013.01); *F01D 17/141* (2013.01); *F02C 6/12* (2013.01)

(58) Field of Classification Search
CPC ...... F02B 37/18; F02B 37/183; F02B 37/186; F01D 17/14; F01D 17/141
USPC .................................. 60/602, 605.2
See application file for complete search history.

(56) References Cited

U.S. PATENT DOCUMENTS

| 6,726,447 B2 * | 4/2004 | Lutz ................ F01D 17/165 415/158 |
| 8,123,470 B2 * | 2/2012 | Serres ............... F01D 17/141 415/157 |
| 2009/0041573 A1 * | 2/2009 | Serres ............... F02C 6/12 415/51 |

FOREIGN PATENT DOCUMENTS

| AT | 505 407 | 1/2009 |
| CH | 407 401 | 8/1966 |
| CH | 688 455 | 12/1988 |
| DE | 10 2008 053 169 | 4/2010 |

(Continued)

*Primary Examiner* — Gregory Anderson
*Assistant Examiner* — Maxime Adjagbe
(74) *Attorney, Agent, or Firm* — Klaus J. Bach

(57) ABSTRACT

In a turbine for an exhaust gas turbocharger with a turbine casing comprising a housing space for the turbine wheel of a turbine with guide vanes arranged upstream of the turbine wheel in a radial direction of the turbine wheel so as to be stationary relative to the turbine casing for guiding exhaust gas to the turbine wheel, and with an actuating element by which an inlet flow cross-section of the turbine through which the exhaust gas flows is variably adjustable and which is movable in the axial direction of the turbine between a blocking position restricting the flow cross-section and an open position clearing the flow cross-section relative to the turbine casing, the actuating elements extend through conforming openings formed in the guide walls between the guide vanes into the spaces defined between the guide vanes for controlling the turbine inlet flow cross-section.

5 Claims, 3 Drawing Sheets

(56) References Cited

FOREIGN PATENT DOCUMENTS

| | | |
|---|---|---|
| EP | 0 034 915 | 2/1981 |
| EP | 1 201 881 | 5/2002 |
| EP | 1 260 675 | 11/2002 |
| EP | 2 025 897 | 2/2009 |
| GB | 2 427 446 | 12/2006 |
| GB | 2 446 323 | 8/2008 |
| WO | WO 03/023194 | 3/2003 |

* cited by examiner

TURBINE FOR AN EXHAUST GAS TURBOCHARGER

This is a Continuation-In-Part application of pending international patent application PCT/EP2012004994 filed Dec. 4, 2012 and claiming the priority of German patent application 10 2011 121 330.2 filed Dec. 16, 2011.

BACKGROUND OF THE INVENTION

The invention relates to a turbine for an exhaust gas turbocharger with a turbine wheel disposed in a turbine housing and a guide vane structure arranged in the turbine inlet flow passage so as to be variably adjustable.

DE 10 2008 053 169 A1 discloses a turbine for an exhaust gas turbo-charger with variable turbine geometry, which comprises guide vanes. The guide vanes are rotatably supported between a guide vane carrier and a shroud cap. The guide vanes serve to guide the exhaust gas of a combustion engine so as to provide for an aerodynamically efficient flow of the exhaust gas to a turbine wheel of the turbine.

Because the exhaust gas flows around the guide vanes, the guide vanes are subjected to very high exhaust gas temperatures. In order to avoid jamming of the guide vanes, so-called functional gaps are to be provided between the guide vanes and the guide vane carrier as well as between the guide vanes and the shroud cap. These functional gaps allow the guide vanes to expand when they are subjected to high temperatures so that no jamming occurs. These functional gaps are required both for Diesel engines and for Otto engines. In Otto engines, particularly high exhaust gas temperatures occur, in particular compared to Diesel engines, so that the functional gaps in Otto engines have to be designed very large.

As an alternative to rotatable guide vanes, the use of stationary guide vanes relative to the turbine casing of the turbine is known, which, by means of a shroud element, may be covered at least partially in a first position whereas in at least a second position of the shroud element the vanes may be exposed to the hot exhaust gas flow. The shroud element may be displaced in the axial direction of the turbine relative to the turbine casing. Such a displaceable element may to some extent eliminate the above described functional gaps which may lead to undesired flow losses. The displaceable element which partially covers the guide vanes in the radial direction is, however, of a relatively high complexity, in particular in combination with adjustable vanes, which results in high costs of the turbine.

It is therefore the object of the present invention to provide a turbine or an exhaust gas turbocharger which may efficiently be adapted to varying exhaust gas mass flows and which does not involve high costs.

SUMMARY OF THE INVENTION

In a turbine for an exhaust gas turbocharger with a turbine casing comprising a housing space for the turbine wheel of a turbine with guide vanes arranged upstream of the turbine wheel in a radial direction of the turbine wheel so as to be stationary relative to the turbine casing for guiding exhaust gas to the turbine wheel, and with an actuating element by which an inlet flow cross-section of the turbine through which the exhaust gas flows is variably adjustable and which is movable in the axial direction of the turbine between a blocking position restricting the flow cross-section and an open position clearing the flow cross-section relative to the turbine casing, the actuating elements extend through conforming openings formed in the guide walls between the guide vanes into the spaces defined between the guide vanes for controlling the turbine inlet flow cross-section.

According to the invention, it is provided that the actuating element, at least in the closing position, is arranged in a space defined in the circumferential direction between the guide elements or vanes. In other words, the flow cross-section and thus the area between the guide vanes via which the exhaust gas is supplied to the turbine wheel, is variably adjustable by moving the actuating element into, or out of, the space between the guide elements. Here, the actuating element does not cover the guide vanes upstream or downstream of the guide vanes but blocks the space between the guide vanes fluidly at least partially in the closing position or, on the other hand, clears the space at least partially or fully in the open position.

The inventive turbine may therefore be adapted to various exhaust gas mass flows as required and be efficiently operated also at varying exhaust gas mass flows, i. e. at high exhaust gas mass flows and, on the other hand, at low exhaust gas mass flows. This variable adjustability of the inventive turbine is achieved in a relatively simple, cost-efficient manner with relatively low installation space requirements.

The low complexity of the inventive turbine contributes to its functional reliability because the risk of a malfunction of the actuating element, e. g. in form of jamming, is very low. This is particularly advantageous with an Otto engine, where extremely high exhaust gas temperatures occur and where the actuating element is subjected to particularly high temperatures. However, it is understood that the inventive turbine may be employed for a Diesel engine, an Otto engine or other combustion engines, that is, reciprocating combustion engines.

Due to the simplicity of the actuating element and thus of the turbine the actuating element may be manufactured particularly quickly and cost efficiently. Another advantage is that no functional gaps are provided between the guide elements and adjoining wall areas of the turbine, which might lead to flow losses. The guide elements can guide the exhaust gas at least essentially without secondary flow losses and thus at least essentially completely and supply it to the turbine wheel in a flow efficient manner. This is beneficial for the efficient operation of the inventive turbine.

In an advantageous embodiment of the invention, a first distance between the actuating element and a first one of the guide elements differs from a second distance between the actuating element and the second guide element at least in the closing position. This allows the adjustment of particularly advantageous flow conditions for the exhaust gas, which results in a particularly efficient operation of the turbine.

Preferably, the turbine is a radial turbine wherein the exhaust gas flows at least essentially in the radial direction to the turbine wheel. Likewise, a so-called mixed flow turbine may be employed, wherein the exhaust gas flows to the turbine wheel at an angle to the radial direction and at an angle to the axial direction.

When the actuating element is located at least partially in the space, this may impart an axial component to the at least essentially radial flow when the exhaust gas flows from the actuating element and the guide elements in the direction of the turbine wheel. This may result in advantageous flow conditions, in particular for a mixed flow turbine.

In another advantageous embodiment of the invention, the outer circumference of the actuating element is formed as a straight circular cylinder at least in an area of the actuating element where the actuating element is arranged between the guide elements. Thereby, the actuating element may be manufactured quickly and cost efficiently. This leads to particularly low costs of the entire turbine. In addition, particularly advantageous flow conditions for the exhaust gas are realized.

Alternatively, the outer circumference of the actuating element may be formed different from a straight circular cylinder at least in the area of the actuating element, in which the actuating element is arranged between the guide elements. Thus, the outer contour of the actuating element may be formed as required for achieving advantageous flow conditions.

In a particularly advantageous embodiment of the invention, the actuating element exhibits an actuating element outer contour at least in the area of the actuating element, in which the actuating element is arranged between the guide elements, which is formed as a contour corresponding at least essentially to a respective guide element outer contour. In other words, the outer contour of the actuating element is at least partially adapted to the respective guide element outer contour. Thus, the flow cross-section may particularly efficiently be restricted or blocked, respectively, which is accompanied by an efficient operation of the turbine.

Preferably, the flow cross-section is maximally restricted in the closing position and maximally enlarged in the open position. It is advantageously provided that the actuating element may be adjusted in at least one intermediate position between the open position and the closing position, wherein the flow cross-section in the intermediate position relative to the closing position is enlarged and relative to the open position is restricted. Preferably, the actuating element is adjustable in a plurality of intermediate positions and at least essentially continuously between the closed and the open positions. Thereby, the turbine may be adapted to a plurality of varying exhaust gas mass flows to meet specific requirements and be operated efficiently.

In another particularly advantageous embodiment, a shroud element is arranged at the actuating element, which at least in the closing position is arranged in the space and by means of which at least in the closing position a first partial area of the space through which exhaust gas may flow in the axial direction is fluidly separated from a second partial area of the space adjoining the first partial area in the axial direction. By means of the shroud element undesired high expansion losses may be avoided, in particular when a very strong axial component is imparted on the flow of the exhaust gas flowing off the actuating element and the guide elements.

When more than two guide elements and thus more than one space between the guide elements are provided one actuating element is preferably allocated to each space, by means of which the associated space and thus each pertinent flow cross-section may be restricted in the closing position and may be enlarged in the open position.

Preferably, a separate shroud element is provided at each actuating element. The actuating elements may also be provided with a common integral shroud element. This keeps the number of parts of the turbine low.

For an easy and simultaneous movement of the actuating elements, they are preferably arranged at a common operating element, e. g. an operating ring. Here, the actuating elements may be manufactured separately from each other and separately from the operating ring and be connected to the operating ring. Thereby, the separately arranged actuating elements are interconnected via the operating ring.

Alternatively, the actuating elements may be formed integrally with the operating ring, i. e. the actuating elements are also formed integrally with each other.

Preferably, the shroud element comprises at least partially a shroud element outer contour which is formed as a contour corresponding at least essentially to the respective guide element outer contour of the guide elements. The space may thus be efficiently fluidly divided, which also provides for advantageous flow conditions.

In another particularly advantageous embodiment of the invention, the operating element or the actuating elements, respectively, are also movable in the radial direction. Therefore, the movement of the operating element may be adapted to the guide elements which are at least essentially formed as 3-dimensional blades and/or to the flow of the exhaust gas, in particular in a mixed flow turbine. Thus, the turbine may very well he adapted to varying exhaust gas mass flows and be efficiently operated.

Further advantages, features and details of the invention will become more readily apparent from the following description of a preferred exemplary embodiment with reference to the accompanying drawings. The features and feature combinations as previously mentioned in the description as well as features and feature combinations which will be mentioned in the following description of the figures and/or which are solely illustrated in the figures are not only applicable in the respective indicated combination but also in other combinations or isolated, without deviating from the scope of the invention.

DESCRIPTION OF EXEMPLARY EMBODIMENTS

Figure 1:
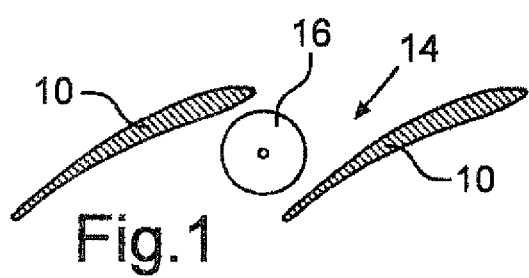
FIG. 1 shows a section of a schematic cross sectional view of a turbine for an exhaust gas turbocharger, which comprises an actuating element for the variable adjustment of an effective flow cross-section of the turbine, wherein the actuating element is arranged at least in its closing position in a space between two guide vanes.

FIG. 1 shows a section of a turbine for an exhaust gas turbocharger of a combustion engine which is used e. g. for driving an automobile, in particular a passenger car. The turbine comprises a turbine casing 11 not fully shown in FIG. 1 with a housing space in which a turbine wheel is accommodated. The turbine wheel with blades 12 is rotatable about an axis of rotation relative to the turbine casing 11. The exhaust gas turbocharger also comprises a compressor with a compressor wheel which may be driven by the turbine wheel. To this end, the turbine wheel and the compressor wheel are rotationally fixed to a shaft.

The turbine casing 11 comprises at least one supply duct 13 via which exhaust gas may be supplied to the housing space and the turbine wheel. The supply duct is formed as an annular duct and extends in the circumferential direction of the turbine wheel over its circumference.

Guide vanes 10 of the turbine are arranged in the supply duct 13. The guide vanes 10 serve to deflect or carry off, respectively, the exhaust gas so that the exhaust gas may aerodynamically efficiently flow to the turbine wheel blades 12 (FIG. 5) of the turbine wheel. Thereby the turbine wheel is efficiently driven which leads to an efficient operation of the entire turbine.

The guide vanes 10 are arranged sequentially in the circumferential direction of the turbine wheel. In FIG. 1, only two guide vanes 10 are illustrated. It is understood that the turbine may comprise more than two guide vanes 10. The guide vanes 10 each exhibiting an airfoil profile are preferably distributed at least essentially equally spaced in the circumferential direction of the turbine wheel over its circumference.

A space 14 is defined in the circumferential direction between the guide vanes 10, through which the exhaust gas may flow to the turbine wheel. In other words, the exhaust gas flows through a flow passage of the space 14 and thus of the turbine. In FIG. 1, one space 14 is depicted. With more than two guide vanes 10 provided, several spaces 14 and thus several flow passages will be provided through which the exhaust gas will flow. The several flow passages form a so-called effective inlet flow cross-section of the turbine, through which the exhaust gas may flow.

By adjusting the effective flow cross-section, i. e. by restricting and, on the other hand, by enlarging the effective flow cross-section, the pressure build-up behavior of the turbine may be controlled. Thereby, the turbine may be adapted to varying exhaust gas mass flows and thus to varying operating points of the combustion engine.

For the variable adjustment of the effective flow cross-section, a bolt 16 is provided for insertion into the space 14. With a plurality of spaces 14, a respective bolt 16 is provided for each of the spaces 14. It is understood that the previous and the following description concerning the bolt 16 may also be applied to the plurality of bolts 16.

The bolt 16 may be moved between a maximally enlarged open position of the effective flow cross-section and a maximally restricting or closing position of the effective flow cross-section in the axial direction of the turbine. Furthermore, the bolt 16 may at least essentially continuously be adjusted between the closing position and the open position and, correspondingly, in several intermediate positions between the open position and the closing position.

The bolt 16 is arranged in the space 14 between the guide vanes 10 at least in the closing position as well as in the intermediate positions where the effective flow cross-section is restricted as opposed to the open position. This permits a particularly simple and robust variable turbine geometry of the turbine. Here, the guide vanes 10 are fixed relative to the turbine casing and, for example, formed integrally with the turbine casing or they are formed by means of a guide baffle which is installed in the turbine casing and formed separately from the turbine casing.

As can be seen from FIG. 1, the bolt 16 is formed at least essentially as a straight circular cylinder at least in the area in which it is arranged or may be arranged, respectively, in the space 14.

Figure 2:
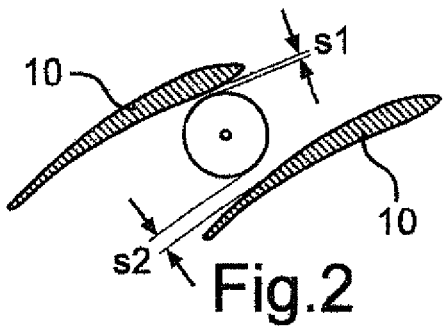
FIG. 2 shows a section of a schematic cross sectional view of another embodiment of the turbine according to FIG. 1.
Figure 3:
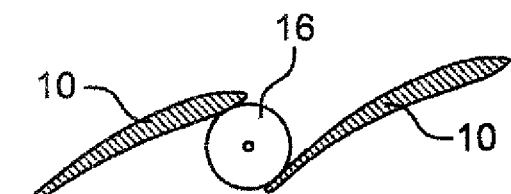
FIG. 3 shows a section of a schematic cross sectional view of another embodiment of the turbine according to FIGS. 1 and 2.

In FIG. 2, a first distance s1 between the bolt 16 and one of the guide vanes 10 as well as a second distance s2 between the bolt 16 and the other guide vane 10 are shown. As can be seen from FIG. 2, the distances s1, s2 may differ from each other. In the present embodiment, the second distance s2 is larger than the first distance s1. When viewed together with FIG. 1 it can be seen that the distances s1, s2 may also be at least essentially identical. It is also possible that the first distance s1 is larger than the second distance s2. According to FIG. 3, the bolt 16 is arranged particularly close to the guide vanes 10.

Figure 4:
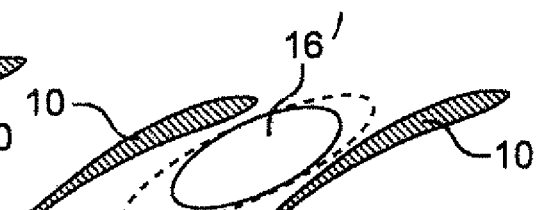
FIG. 4 shows a section of a schematic cross sectional view of another embodiment of the turbine according to FIGS. 1 to 3, wherein the actuating element has an elliptical cross-section.

As can be seen from FIG. 4, the outer circumference of the bolt 16 may be formed at least in the area in which it is arranged or may be arranged, respectively, in the space 14 different from a straight circular cylinder. The outer circumference of the bolt 16' may also be formed at least essentially elliptical or at least essentially adapted to outer contours of the guide vanes 10 with respect to its outer contour. In other words, the outer contour of the bolt 16' may be formed at least essentially as a contour (negative contour) corresponding to the outer contours of the guide vanes 10.

Figure 5:
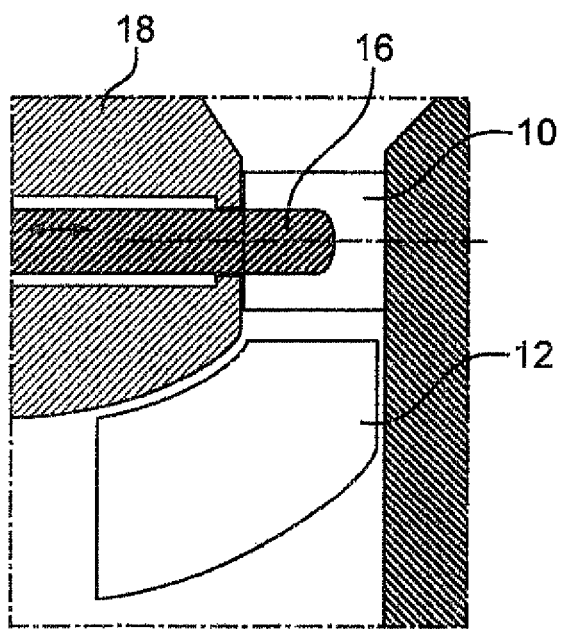
FIG. 5 shows a section of a schematic longitudinal sectional view of another embodiment of the turbine according to FIGS. 1 to 4.

In FIG. 5, the turbine casing is identified by the numeral 18. As can be seen from FIG. 5, the bolt 16 may be movably guided by the turbine casing 18 so as to be axially movable relative to the turbine casing 18.

Figure 6:
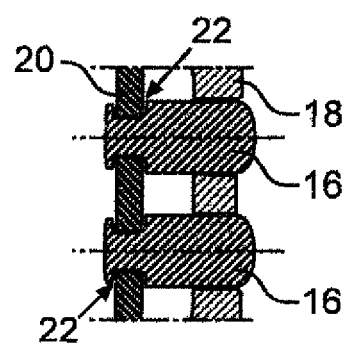
FIG. 6 shows a section of a schematic and developed longitudinal sectional view of the turbine according to FIG. 5.

FIG. 6 shows a plurality of bolts 16 which are movable by means of a common slide ring 20 in the axial direction relative to the turbine casing 18. The bolts 16 are formed separately from the slide ring 20 and attached at the slide ring 20. For this purpose, the bolts 16 comprise recesses 22, in particular grooves, with which the slide ring 20 engages. In this manner, the plurality of bolts 16 may be adjusted in the axial direction via the slide ring 20 by means of only one single actuating member.

Figure 7:
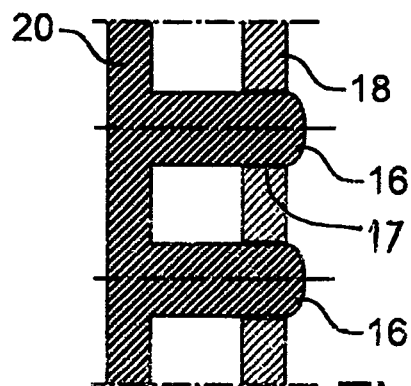
FIG. 7 shows a section of a schematic and developed longitudinal sectional view of another embodiment of the turbine according to FIG. 6, wherein the actuating elements are formed integrally with a slide ring.

As an alternative to the separate configuration of the bolts 16 from the slide ring 20, it is possible according to FIG. 7 to form the slide ring 20 and the bolts 16 integrally. Here, the bolts 16 are also formed integrally with each other.

As can be seen from FIGS. 6 and 7, the bolts 16 are associated with respective through-holes 17 of the turbine casing 18, through which the bolts 16 may protrude into the respective spaces.

Figure 8:
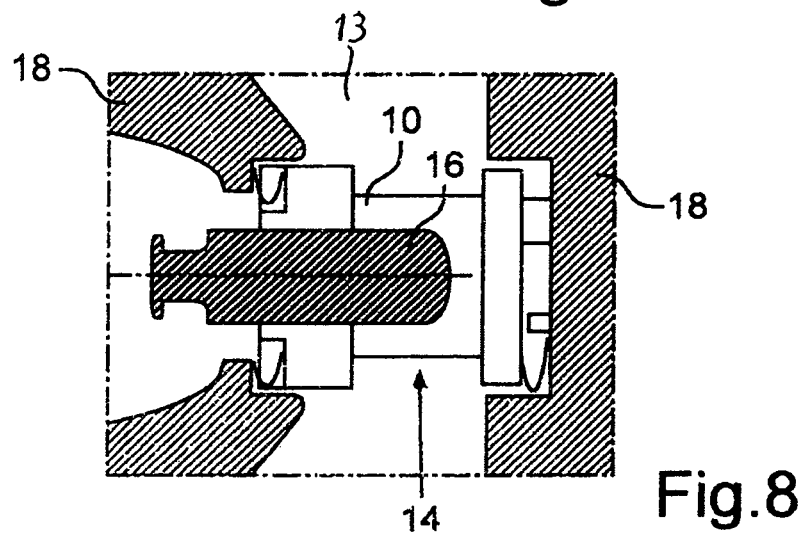
FIG. 8 shows a section of a schematic longitudinal sectional view of another embodiment of the turbine according to FIG. 5.

According to FIG. 8, the guide vanes 10 are formed by means of a guide baffle which is installed in the turbine casing 18 as an insert element. In the present embodiment, the guide baffle is integrally formed. It may, however, also be formed as a two or multi-piece component. The bolt 16 may be inserted through the through hole of the guide baffle so as to protrude via the through hole into the space 14.

Figure 9:
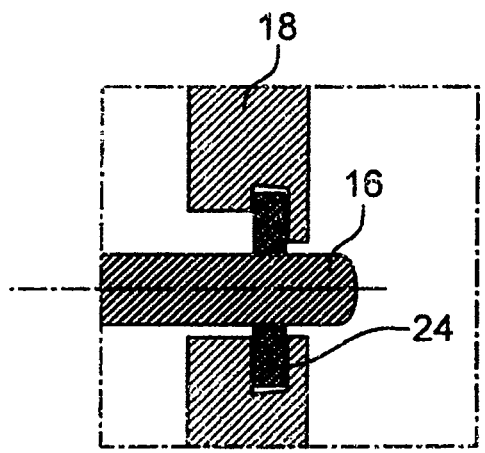
FIG. 9 shows a section of a schematic longitudinal sectional view of another embodiment of the turbine according to FIG. 8.

FIG. 9 shows a possibility of sealing the guide baffle or in the present embodiment the turbine casing 18, respectively, against the bolt 16 penetrating the guide baffle or the turbine casing 18, respectively. A sealing element 24 is provided for sealing, which on the one hand is seated in the grooves of the turbine casing 18 (or of the guide baffle, respectively) and, on the other hand, contacts the bolt 16. The sealing element 24 may be a piston ring. This seal prevents that exhaust gas from the space 14 flows via the through hole of the turbine casing 18 or of the guide baffle, respectively, which corresponds with the bolt 16, and thus past the turbine wheel or undirected into the turbine wheel.

Figure 10:
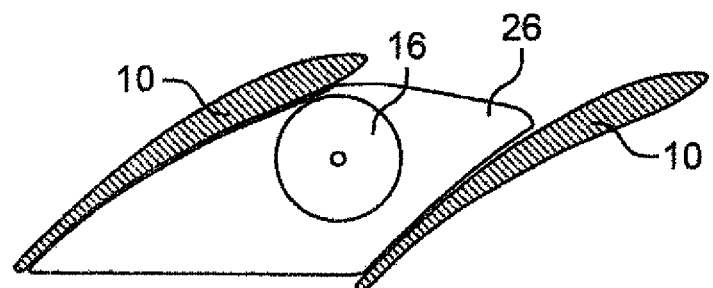
FIG. 10 shows a section of a schematic cross sectional view of another embodiment of the turbine according to FIG. 2.
Figure 11:
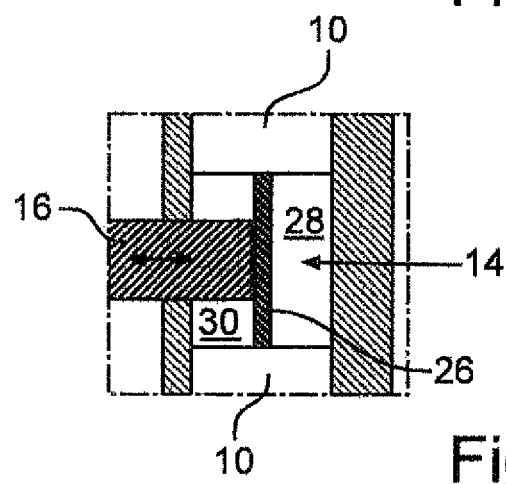
FIG. 11 shows a section of a schematic longitudinal sectional view of the turbine according to FIG. 10.

According to FIGS. 10 and 11, a respective shroud element 26 is arranged at, and connected to, each bolt 16, for axial movement therewith whereby the space 14 may be fluidly divided into a first partial area 28 through which exhaust gas may flow and a second partial area 30 adjoining the first partial area 28 in the axial direction. Depending on the distance of the bolt 16 from the guide vanes 10, the exhaust gas may also flow through the second partial area 30. By means of the shroud element 26, undesirably high expansion losses may be prevented, when the exhaust gas flows past the guide vanes 10 and the walls of the turbine adjacent to the guide vanes 10 in the axial direction.

In lieu of the single shroud elements 26, the shroud elements 26 may also be integrally formed with each other, so that an integral overall shroud element is formed. This is illustrated in FIG. 12.

Figure 12:
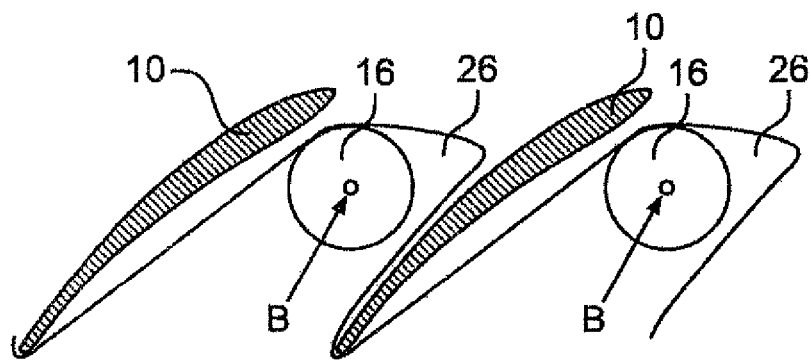
FIG. 12 shows a section of a schematic cross sectional view of another embodiment of the turbine according to FIGS. 10 and 11.

As indicated in FIG. 12 by areas B, it is advantageous, to arrange the integral shroud elements 26 at the bolts 16 in such a manner that relative movements, e. g. due to heat expansion and/or due to deformation, are possible during operation of the turbine.

What is claimed is:

1. A turbine for an exhaust gas turbocharger with a turbine casing (18), comprising a housing space for a turbine wheel provided with blades (12), the turbine casing including radial inlet passages (13) with guide vanes (10) which are fixedly arranged upstream of the turbine wheel (12) in the radial inlet passages (13) formed between stationary guide walls of the turbine casing (18) for guiding exhaust gas to the turbine wheel blades (12), and with actuating elements (16) by means of which an inlet flow cross-section of the turbine through which the exhaust gas flows is variably adjustable and which are movable in the axial direction of the turbine between a blocking position restricting the flow cross-section and an open position clearing the flow cross-section relative to the turbine casing (18), the actuating elements (16) being bolt-like and extending through separate conforming openings formed in the guide walls between the guide vanes (10) into, and out of, the radial inlet passages (13) defined between the guide vanes (10) for controlling the turbine inlet flow passage cross-section.

2. The turbine according to claim 1, wherein a first distance (s1) between the actuating elements (16) and a respective first one of the guide vanes (10) is different from a second distance (s2) between the actuating elements (16) and an adjacent second one of the guide vanes (10) at least in the blocking position of the actuating elements (16).

3. The turbine according to claim 1, wherein the outer circumference of each actuating element (16) is in the form of a straight circular cylinder at least in an area of the actuating element (16), in which the actuating element (16) is disposed in the closed position between the guide vanes (10).

4. The turbine according to claim 1, wherein a shroud element (26) is arranged at a front end of each the actuating element (16) in the space (14) between adjacent guide vanes (10) so that partial flow passage areas (28, 29) are formed in the space (14) through which exhaust gas may flow fluidly separated from one another, and the shroud element (26) being connected to the respective and actuating element (16).

5. The turbine according to claim 4, wherein the shroud element (26) at least partially has a shroud element outer contour which is in the form of a contour corresponding at least essentially to a respective outer contour of the adjacent guide vanes (10).

* * * * *